United States Patent [19]
Brady et al.

[11] 3,912,477
[45] Oct. 14, 1975

[54] APPARATUS FOR PROCESSING GLASS BATCH MATERIAL

[75] Inventors: William C. Brady, Granville; William F. Giles, Maumee, both of Ohio

[73] Assignee: Owens-Corning Fiberglas Corporation, Toledo, Ohio

[22] Filed: Oct. 15, 1974

[21] Appl. No.: 514,545

Related U.S. Application Data

[63] Continuation-in-part of Ser. No. 321,412, Jan. 5, 1973, abandoned, which is a continuation of Ser. No. 70,811, Sept. 9, 1970, abandoned.

[52] U.S. Cl. ................... 65/1; 13/6; 13/25; 65/11 R; 65/11 W; 65/356
[51] Int. Cl.² .................. C03B 5/08; C03b 37/02
[58] Field of Search ............ 13/6, 25; 219/252, 253; 338/319, 320; 65/1, 2, 11 W, 11 R, 4, 6, DIG. 4

[56] References Cited
UNITED STATES PATENTS

| | | | |
|---|---|---|---|
| 2,181,030 | 11/1939 | Thomas | 13/6 |
| 3,030,434 | 4/1962 | Gell | 13/6 |
| 3,056,846 | 10/1962 | Glaser | 13/6 |

*Primary Examiner*—Robert L. Lindsay, Jr.
*Attorney, Agent, or Firm*—Carl G. Staelin; John W. Overman; Ronald C. Hudgens

[57] ABSTRACT

A heating unit for flowable material such as molten glass where the unit includes a receptacle for the flowable material, heating elements having an appreciable depth compared with their thickness within a body of flowable material in the receptacle with the depth of the heating elements oriented in a direction generally normal to the surface of the body and means for electrically energizing the heating elements.

5 Claims, 13 Drawing Figures

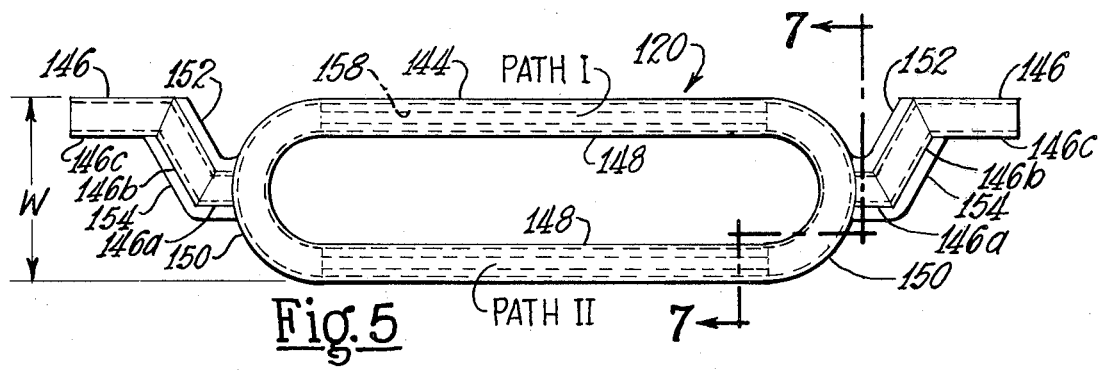
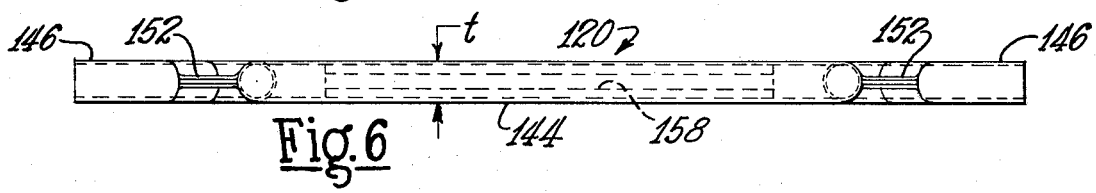
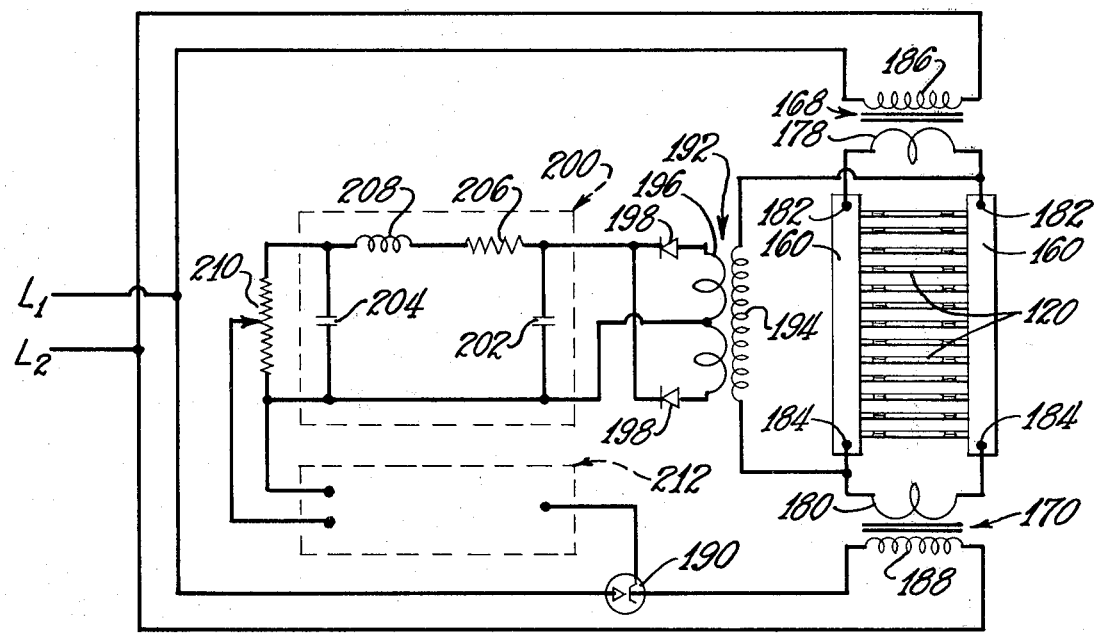
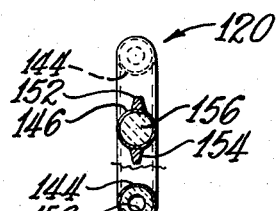

APPARATUS FOR PROCESSING GLASS BATCH MATERIAL

This is a continuation-in-part of application Ser. No. 321,412, filed Jan. 5, 1973, which is a continuation of application Ser. No. 70,811, filed Sept. 9, 1970, both now abandoned.

BACKGROUND OF THE INVENTION

Production demands have pressed to the limit existing furnace or melter technology using heat generated from a heating element extending across a melting chamber to melt high temperature fusing mineral material into a heat softened body. Prior concepts were especially stale in furnace apparatus using a heating element across a melting chamber to heat batch mineral material into a molten body of glass supplying a feeder from which molten glass streams flow for producing glass filaments.

Prior furnaces using a heating element employ a sheet-like, usually curved, metal electrical current conducting heater element across a melting chamber. When high amperage electrical current passes through the sheet-like heating element, ensuing intense heat from the energized element continuously converts input material into a molten mass in the melting chamber. When an arrangement uses the furnace or melter to supply molten material to other apparatus, prior arrangements orient the heater element across the direction of flow of the molten material towards the outlet to the other apparatus. The heating element has perforations or slots through which molten material travels towards the outlet.

In producing continuous glass filaments, it was found that increased output or "throughput" requires faster molten glass movement through the openings in the sheet-like heating element. As the speed of the molten glass increases, the heating element can not satisfactorily convert batch to molten glass. Accordingly, heating capacity became the limiting factor in "throughput" of the apparatus. The only answer appeared to be larger melting units; however, the expense and difficult operating characteristics of larger melting units based on prior concepts presented a dismal outlook for effectively increasing "throughput."

SUMMARY OF THE INVENTION

An object of the invention is improved apparatus for heating a body of flowable material.

Another object is improved apparatus for heating heat softenable material to a flowable condition.

Still another object of the invention is improved melting apparatus for heating batch mineral material into molten glass for processing into glass filaments at substantially increased rates.

Yet another object of the invention is electrical melting apparatus having increased capacity for heating batch mineral material into molten glass for processing into continuous glass filaments where the apparatus has a size substantially the same as prior electrical melting apparatus.

One can attain the above and other objects through the use of apparatus that includes a receptacle having spaced apart electrical current conducting heating elements submerged in a body of flowable material in the receptacle where the depth of the elements is appreciable compared with their thickness and the depth is oriented generally normal to the surface of the flowable material. The apparatus includes means for electrically energizing the heating elements.

Other objects and advantages of the invention will become apparent as the invention is described hereinafter in more detail with reference made to the accompanying drawings.

DESCRIPTION OF THE DRAWINGS

FIG. 5 is an enlarged side elevation view of one of the heating elements shown in FIGS. 3 and 4.

FIG. 6 is a plan view of the heating element shown in FIG. 5.

FIG. 7 is an end elevation view of the heating element shown in FIGS. 5 and 6 taken substantially on the line 7—7 of FIG. 5.

FIG. 8 is a diagram of an electrical supply arrangement and control circuit for the heating elements.

DESCRIPTION OF THE PREFERRED EMBODIMENTS

While the invention finds particular use in manufacturing glass filaments, one may use the invention in processing flowable and heat softenable materials generally. The use of glass filament forming apparatus is an example only to explain the operation of the invention.

Figure 1:
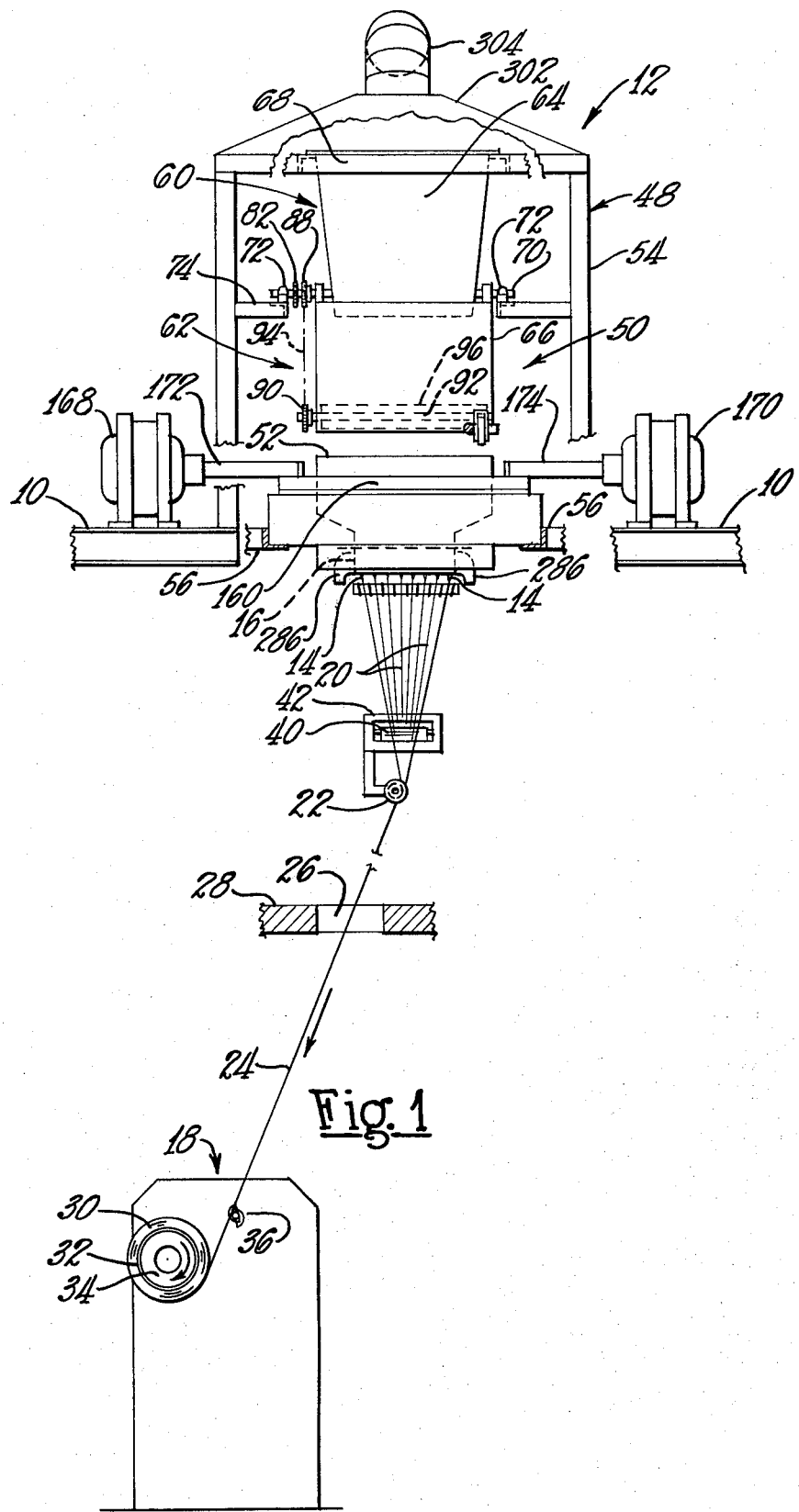
FIG. 1 is a front elevation view of apparatus for producing continuous filament glass strand according to the principles of the invention.
Figure 2:
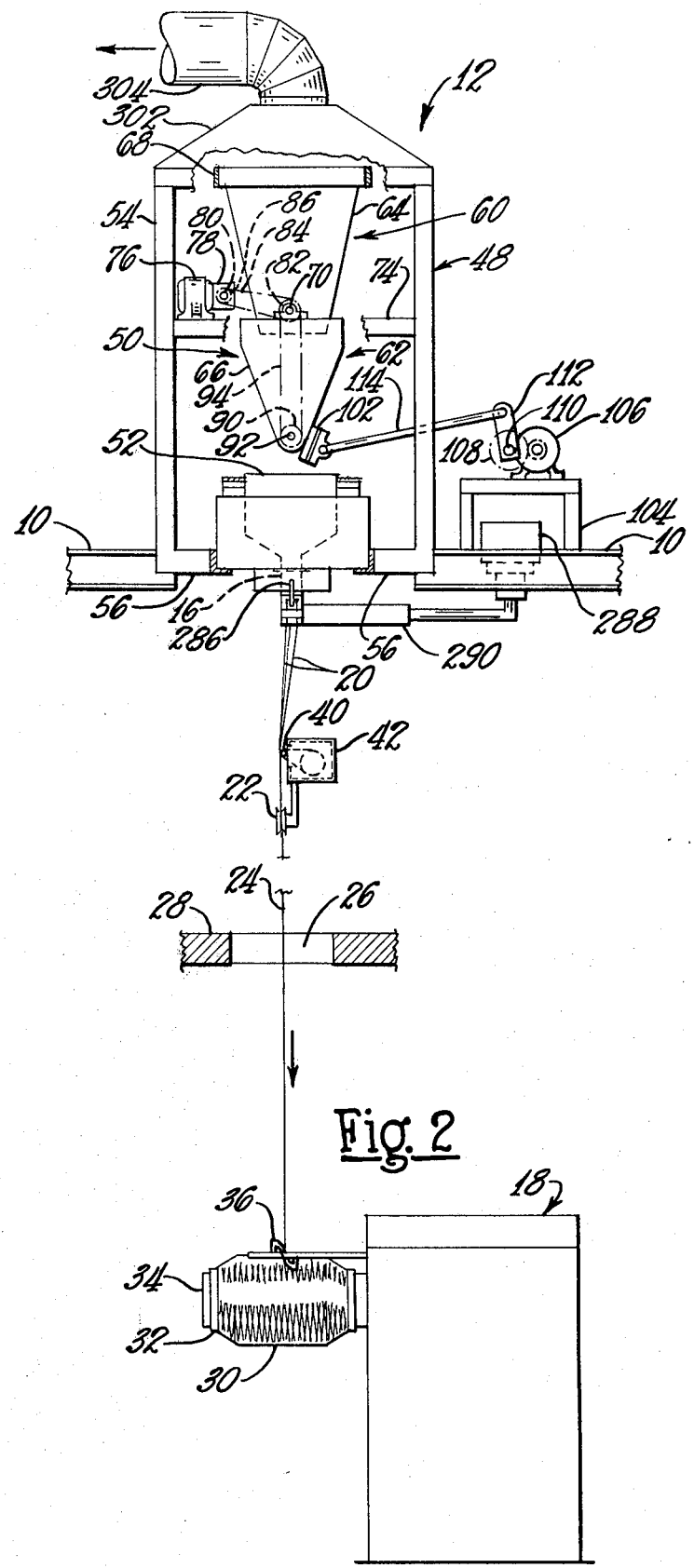
FIG. 2 is a side elevation view of the apparatus illustrated in FIG. 1.

FIGS. 1 and 2 show apparatus on three levels operating to produce continuous filament glass strand that collects as a wound package. As illustrated an upper level floor 10 between the upper and intermediate levels supports a processing assembly 12 that supplies molten glass streams 14 from a feeder or bushing 16. A winder 18 on the lower level attenuates the molten glass streams 14 into continuous glass filaments 20. A gathering shoe 22 at the intermediate level combines the advancing continuous glass filaments 20 into a glass strand 24. The winder 18 advances the strand 24 downwardly through an opening 26 in the intermediate floor 28 to wind the strand 24 as a package 30 on a suitable collector such as a tubular collector 32 telescoped onto a collet 34. The winder 18 drives the collet 34 in rotation. A reciprocatable and rotatable strand traversing means 36 reciprocates the advancing strand 24 lengthwise of the collecting tube 32 to distribute the strand 24 on the strand package 30.

At the intermediate level an applicator 40 supported within a housing 42 applies sizing liquid or other coating material to the advancing filaments 20. The applicator 40 may be any suitable means known to the art such as an endless belt that moves to pass through a sizing liquid or other coating material held in the housing 42. As the filaments 20 travel across the surface of the moving applicator 40, some of the sizing liquid or other coating material on the applicator transfers to the filaments.

The processing assembly 12 includes a frame 48 supporting a batch feeding section 50, a furnace receptacle or melter 52 heating batch mineral material supplied from the feeding section 50 into a molten glass and the feeder or bushing 16 receiving molten glass from the melter 52. The frame 48 includes vertical portions 54 and horizontal bottom portions 56.

In the embodiment illustrated the feeding section 50 includes a batch supply portion 60 and a batch distributing portion 62 that cooperate to continuously provide a layer of batch material in comminuted form over the upper surface of a body of molten glass held in the melter 52. The batch supply portion 60 positions a relatively stationary hopper 64 with a supply of batch mineral material in comminuted form above a supplemental hopper 66 that is part of the batch distributing portion 62. Cross members 68 forming part of the frame 48 hold the relatively stationary hopper 64 above the supplemental hopper 66.

As shown the batch distributing portion 62 both meters and regulates the delivery of batch mineral material into the melter 52 and distributes the batch mineral material over the entire open area of the open top of the melter 52. Accordingly, apparatus regulates batch material leaving the supplemental hopper 66 and moves the hopper 66 for batch distribution. In the arrangement the supplemental hopper 66 mounts on a shaft 70 held on journal bearings 72 carried by cross members 74 on the frame 48. An electric motor 76 drives a rotational batch regulating means through a speed reducing mechanism 78 and a drive system. The output shaft 80 of the speed reducing mechanism 78 drives the shaft 70 through a chain 84 connecting a sprocket 82 on the shaft 70 with a sprocket 86 on the output shaft 80. The rotational energy of the shaft 70 transfers to the batch regulation means. As the shaft 70 rotates, a sprocket 88 fixed on the shaft 70 drives a sprocket 90 on a shaft 92 through a second chain 94. The shaft 92 is at the outlet region of the supplemental hopper 66 and mounts for rotation in bearings carried by the supplemental hopper 66. The shaft 92 extends across the outlet of the hopper 66 and has radially extending blades or veins 96. As the electrical motor 76 rotates the shaft 92 through the drive system of chains and sprockets, the veins 96 move to regulate batch material from the supplemental hopper 66 to the melter 52. One may control the rate of delivery of the batch material from the supplemental hopper 66 into the melter 52 by varying the speed of rotation of the shaft 92 and consequently the movement of the veins 96.

The supplemental hopper 66 is swingable or oscillatable about the axis of the shaft 70 for distributing batch material from the hopper 66 over the open area of the melter 52, such motion providing a substantially uniform layer of batch material on the surface of the body of molten glass in the melter 52. The arrangement secures a bracket 102 to one wall of the hopper 66 near the bottom or outlet region of the hopper 66. A platform 104 on the upper floor 10 supports an electric motor 106 that drives a speed reducing mechanism 108. The output shaft 110 of the speed reducing mechanism has fixed on it an arm 112 that pivotally connects with a rod or link 114. The other end of the link 114 pivotally connects to the bracket 102. As the electric motor 106 rotates the output shaft 110 of the speed reducing mechanism 108, the arm 112 moves the link 114 to oscillate the outlet of the supplemental hopper 66 back and forth across the open entrance to the melter 52.

Figure 3:
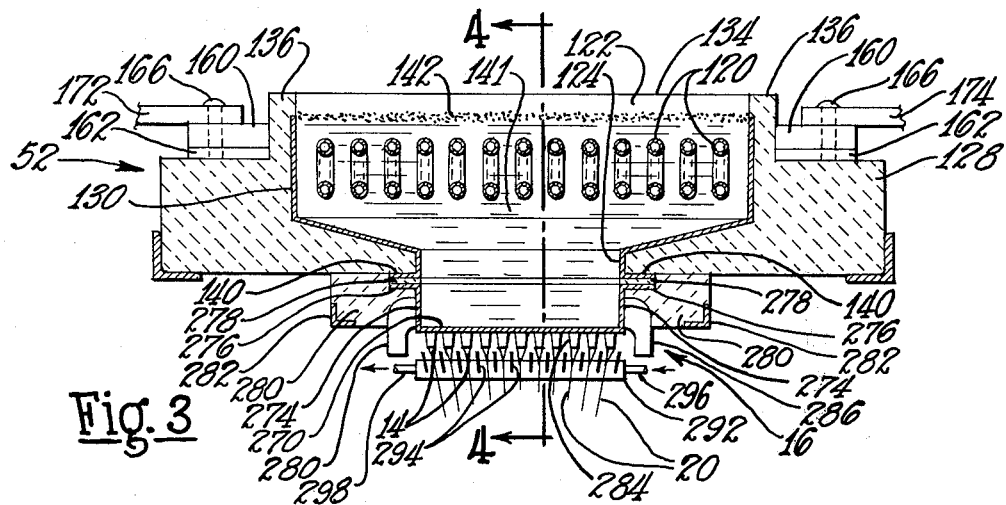
FIG. 3 is a longitudinal sectional view of a melter and feeder arrangement according to the principles of the invention used in the apparatus shown in FIGS. 1 and 2.
Figure 4:
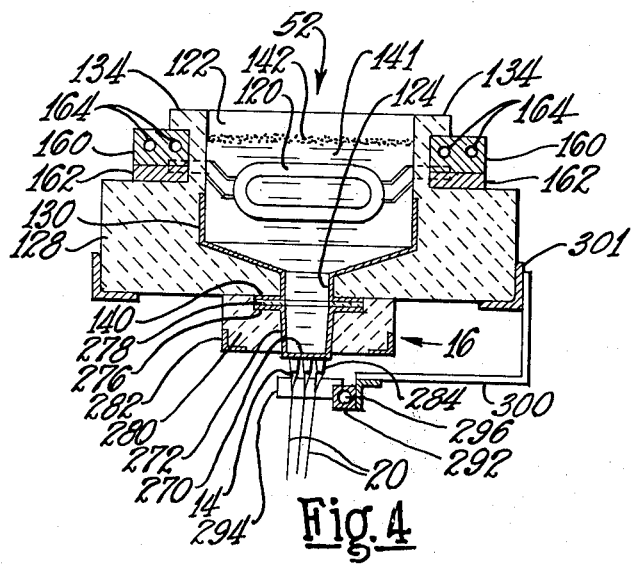
FIG. 4 is a transverse section view taken substantially on the line 4—4 of FIG. 3.

FIGS. 3 and 4 show the construction of the melter 52 and feeder or bushing 16 arrangement forming part of the processing assembly 12 shown in FIGS. 1 and 2. The melter 52 converts batch mineral material to molten glass through heat supplied by spaced apart generally parallel electrical current conducting heating elements 120 extending across the interior or melting chamber 122 of the melter 52. Molten glass in the melter 52 flows into the bushing 16 through the melter's outlet or exit passageway 124.

The melter 52 comprises a refractory cover 128, a liner 130 and a heating arrangement including the heating elements 120.

The refractory cover 128 is built of high temperature resistant refractory. The refractory cover 128 includes lengthwise extending portions 134 and transversely extending portions 136. These portions define an entrance region for receiving batch material from the supplemental hopper 66.

The liner 130 conforms to the interior arrangement of the refractory construction of the melter 52 to define the melting chamber 122. Because the liner 130 must not deteriorate appreciably under high melting temperatures generally present during the operation of the melter 52, the liner 130 is normally made of platinum or a platinum alloy such as an alloy containing a substantial percentage of rhodium. It is possible to use other high temperature resisting materials for the liner 130.

The liner 130 is not electrically energized; it is separated electrically from electrical circuits and supplies. As more easily seen in FIGS. 3 and 4 the lower portion of the liner 130 defines the outlet passageway 124 and terminates at its lower portion with flanges 140.

An electrical arrangement supplies low voltage and high amperage electrical energy to the heating elements 120. The electrical arrangement supplying current to the heating elements 120 is electrically separate from the liner 130. Intense heat generated from electrically energizing the heating elements 120 melts the batch material into molten glass.

The position of the heating elements 120 is beneath the surface of a body of molten glass in the melting chamber 122. As shown in FIGS. 3 and 4 the heating elements 120 are under the surface of a body of molten glass 141, the upper surface of the molten glass being covered by a layer 142 of unmelted batch mineral material in comminuted form continuously supplied from the supplemental hopper 66. Both the electrical arrangement supplying current to the heating elements 120 and the heating elements 120 themselves are electrically separate from the liner 130.

The current conducting heating elements 120 have a width or depth at least as large as their thickness; the depth of the heating elements 120 is oriented generally normal to the surface of the body of molten glass. In a specific form, which is more plainly seen in FIGS. 5 through 7, the current conducting heating elements have an appreciable depth compared with their thickness. As shown the heating elements 120 are made of electrical current conducting tubular material formed into longitudinal units having a somewhat flattened elliptical or race-track shaped central portion 144 and connectors 146 extending from the ends of the central portion 144. The elongated central portion 144 includes two spaced apart parallel straight middle elements 148 and shorter end elements 150 connecting the adjacent ends of the straight element 148. In the form illustrated the end elements 150 are semi-circular. In FIG. 5 w indicates the width or depth of the heating elements 120; in FIG. 6 t indicates the thickness of the elements 120. In the specific form shown the thickness of the heating elements 120 is the diameter of the tubular material comprising the elements 120.

Because of the elongated shape of the central portions 144, electrical current divides as it leaves the connectors 146 to flow into the elongated central portions 144. As shown in FIG. 5 the central portions 144 provide two distinct current paths, viz. Path I and Path II.

As with the liner 130, the material tubular units comprising the heating elements 120 is platinum or an alloy of platinum.

The connectors 146 are curved tubular members. A portion 146a extends axially away from the central portion 144 for a short distance; then the connectors 146 turn with a portion 146b extending obliquely of the element's lengthwise axis before again turning with a portion 146c extending in a direction axially away from the central portion 144. Moreover, the connectors 146 include metal strip portions 152 and 154 extending outwardly and generally lengthwise of the portions 146a and 146b. These metal strips provide additional metal for electrical current; the strips assist uniform division of electrical current into the distinct current paths of the elongated central portion 144.

To assist heat distribution that promotes more uniform heat emission throughout the current conducting heating elements 120, heat resistant material in the form of refractory is within the hollow tubular units comprising the current conducting elements 120. In FIG. 5 one can see that refractory 156 fills the interior of the connectors 146. Refractory also fills the interior of the curved end elements 150. It has been useful to use an aluminum oxide refractory. A refractory tubing 158 snugly fits against the inner surface of the straight middle elements 148. The tubing 158 strengthens the middle elements 148. An aluminum oxide tubing commercially available from McDaniel Company under the designation "AP-35" gives good results.

As shown in FIGS. 3 and 4, the electrical current conducting heating elements 120 extend transversely across the melting chamber 122 in spaced apart adjacent generally parallel relationship. The distance between adjacent elements 120 is normally from 1 to 3 inches, 2 inches being most common. Moreover, the depth or width w of the heating elements are oriented generally in the direction of flow of molten glass moving to the exit passageway or opening 124 to the feeder 16. In the vertical process shown in FIGS. 1–4 the heating elements are vertical and normal to the surface of the body of molten glass 141.

Electrical current carrying bus bars support and electrically interconnect the current conducting heating elements 120 at their ends. As shown two sets of bus bars, viz. bus bars 160 and 162, each extend lengthwise along the upper surface of the refractory cover 128. Cooling tubes 164 extend through each of the upper and heavier bus bars 160 to carry cooling water that controls the temperature of the bus bars. Each of the bus bars 160 and 162 contains generally semi-circular recesses. The recesses in each bar 160 align with the recesses in bar 162 to form gripping regions into which fit the end portions of the connectors 146. When pressed together such as by bolts 166, the gripping regions of the bus bars rigidly hold the current conducting heating elements 120.

An electrical arrangement supplies electrical current to each set of bus bars 160 and 162 and consequently to the elements 120 from transformers 168 and 170 through conductors 172 and 174 respectively.

In operation, electrical current flows from the bus bar arrangement to the central portion 144 of the current conducting heating elements 120 through the connectors 146. As the current reaches connector portions 146b and 146a, the current more easily flows through the metal strips 152 and 154. In a sense, at start-up of the melter 52 these strips tend to orient the current for substantially uniform current split between the two distinct current paths, i.e. Paths I and II, of the heating elements 120.

As the supplemental hopper 66 supplies the layer 142 of batch material to the surface of the molten glass 141 in the melting chamber 122, the energized elements 120 provide intense heat under controlled conditions that regulate the melter's melting rate with the rate of molten glass delivery from the feeder 16. Because the heating elements 120 are submerged in the body of molten glass 141, batch normally does not directly engage the heating elements 120. Usually the heating elements are from 1-3 inches beneath the surface of the molten glass 141 in the melting chamber 122.

If in the melting chamber 122 the temperature of molten glass at the upper leg (Path I) of the heater elements 120 becomes cooler than molten glass near the lower leg (Path II), resistance of the metal in the tubular material along Path I becomes less than resistance of metal along Path II. Accordingly additional current flows along Path I to increase the temperature of that portion of the heating elements. In similar fashion, if conditions reduce the temperature of the metal in the lower leg (Path II) of the elements 120, additional current flows along Path II to increase temperatures in that leg. Consequently, temperature conditions along the length and width of the elements 120 effect current flow to somewhat compensate and make more even thermal treatment of molten glass by the heating elements 120.

The refractory within the heating elements 120 promotes more uniform heat emission throughout the heating elements 120. Accordingly the molten glass receives a more uniform thermal treatment. The refractory tends to store thermal energy. If for any reason a cool zone develops on a heating element 120, heat from the refractory flows to that cooler zone to assist in raising the temperature of the zone to a temperature substantially equal to the surrounding temperature.

FIG. 8 shows a circuit for controlling electrical energy supplied to the heating elements 120 from the transformers 168 and 170 and consequently generally controlling the thermal energy emitted by the heating elements 120.

As shown, the secondary 178 of the power transformer 168 and the secondary 180 of the power transformer 170 connect to adjacent ends of the bus bars at terminals 182 and 184 respectively. Suitable electrical means supplies the primaries 186 and 188 of the power transformers 168 and 170 respectively with electrical power through leads $L_1$ and $L_2$. The electrical power to the leads $L_1$ and $L_2$, for example, may be 60 cycles alternating current of 440 volts. The secondaries 178 and 180 reduce the voltage from the primaries 186 and 188 to provide around 5 to 6 volts to the bus bars with sufficiently high current flow, for example 5,000 amperes, to heat the elements 120 by conventional resistance heating to the high temperatures needed in the melter 52 to convert the batch mineral material into molten glass for delivery to the feeder 16.

A control circuit using a silicon control rectifier 190 senses voltage variations caused by resistance changes in the heating elements 120; changes in resistance may occur, for example, upon interruption of normal glass flow from the feeder 16 occurring as the winder 18 completes a package 30 and an operator puts a new collector on the collet 34. The sensing circuit modifies the power supply current to restore a predetermined temperature to the heater strips 120 for better control of molten glass flow through the melter 52 to the feeder 16. Because the time-constant characteristics of the silicon control rectifier 190 are small, any deviation from a preselected flow rate is at a minimum.

As shown the control circuit uses a control transformer 192 with its primary 194 connected across the terminals 182 and 184. The transformer 192 preferably provides a 4 to 1 reduction in voltage; accordingly, the circuit uses a center tap assembly 196. Diodes 198 rectify the current in the secondary 196. A pi filter circuit 200 receives the rectified current. The pi filter circuit 200 comprises a pair of parallel connected condensers 202 and 204 having interposed between them a resistance 206 and an inductance 208 connected in series.

The resulting direct output from the pi filter circuit 200 is applied across a voltage divider 210 that gives an exceedingly small output signal, for example an approximately 10 millivolt DC output, to a control unit 212 of conventional construction. The silicon control rectifier 190 receives the output of the control unit 212. The silicon control rectifier 190 holds the time-constant factor of the power circuit below one-quarter cycle.

The voltage sensing circuit is a more rapid sensing system than a thermocouple system. Through the electrical supply and control arrangement shown in FIG. 8, the melter 52 provides a more stable temperature for melting batch material to molten glass as the winder 18 attenuates glass fibers from the molten streams supplied at the outlets of the feeder 16. The result is glass fibers of more uniform dimension throughout package build and between packages produced using the apparatus of the invention.

Figure 9:
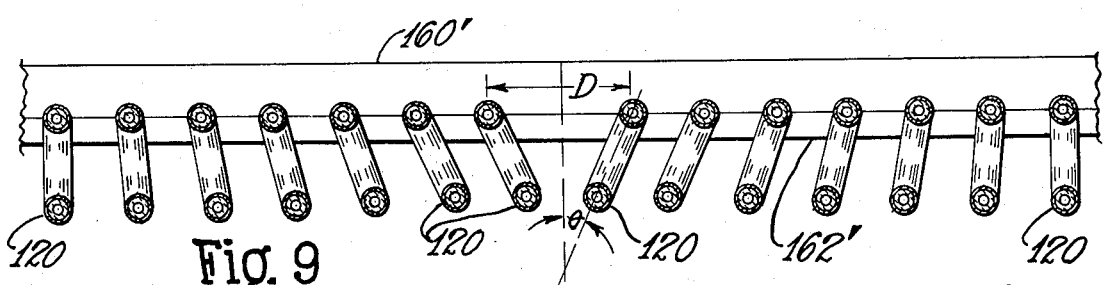
FIG. 9 is another heating element orientation within a melting receptacle.

FIG. 9 shows another arrangement for the heating elements 120 in the melter 52. In FIG. 9 there are an even number of elements 120; the distance D between the upper legs (Path I) of the middle two elements 120 is approximately twice the distance between the other elements 120. Because the distance between the adjacent elements 120 is normally from 1 to 3 inches, the distance D is usually from 2 to 6 inches, 4 inches being more common. To give more uniform heat paths for molten glass in the melter 52, the arrangement orients most of the elements 120 to slant towards the central region of the melting chamber 122. As shown all the elements 120, except for the outermost or end elements, make an angle $\theta$ with the vertical. While the end elements are vertical, the other elements slant towards the central region of the melter 52 with a progressively increasing angle $\theta$; normally angle $\theta$ varies from 5 to 25 degrees, angle $\theta$ is largest for the center most heating elements 120. The arrangement shown in FIG. 9 orients the lower legs (Path II) at substantially equal distances apart.

As the heating element arrangement of FIG. 9 operates to convert batch mineral material to molten glass, the molten glass encounters substantially the same thermal treatment as it flows along its path to the outlet of the melting receptacle.

Figure 10:
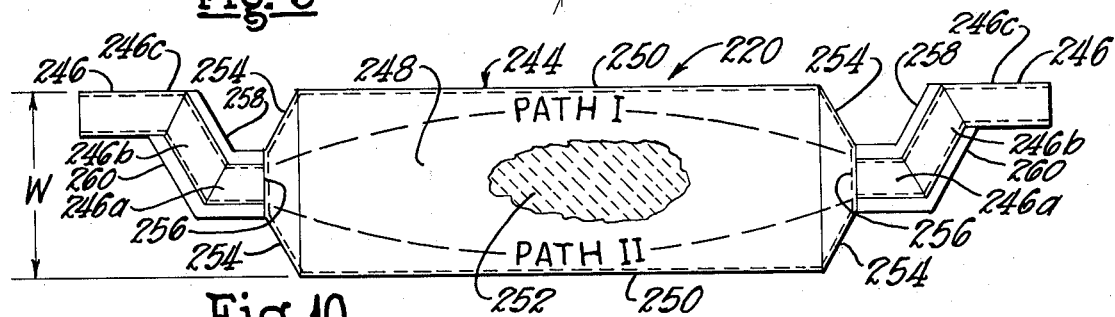
FIG. 10 is a side elevation view of another heating element according to the principles of the invention.
Figure 11:
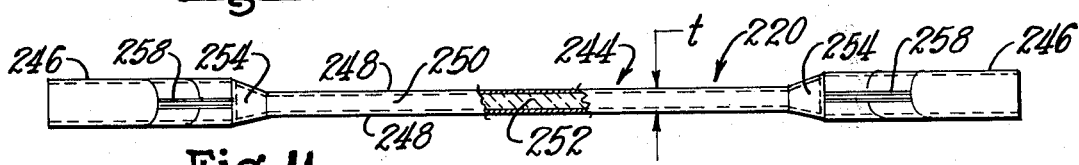
FIG. 11 is a plan view of the heating element shown in FIG. 10.

FIGS. 10 and 11 show another electrical current conducting heating element, i.e. heating element 220, according to the principles of the invention. The heating element 220 has an elongated generally rectangular central portion 244 with connectors 246 extending from the ends of the central portion 244. The central portion 244 includes two spaced apart side walls 248 and two spaced apart thickness wall portions 250 that unite to provide a hollow unit. Refractory 252 fills the interior of the central unit 244. The central portion has a depth or width $w$ and a thickness $t$.

The central portion 244 includes oblique end wall portions 254 and a middle portion 256 from which extend the connectors 246.

The connectors 246 are curved tubular members and have generally the same configuration as the connectors 146. A portion 246a extends axially away from the middle end portion 256 of the portion 244 for a short distance; then the connectors 246 turn with a portion 246b extending obliquely of the element's lengthwise axis before again turning with a portion 246c extending axially away from the central portion 244.

As in the case of the heating elements 120, the connectors 246 include metal strip portions 258 and 260 running generally lengthwise of the portion 246a and 246b. These metal strips, as in the case of portions 152 and 154, provide additional metal that tends to assist uniform division of electrical current into two generally distinct current paths lengthwise of the central portion 244.

As indicated by the dashed lines in FIG. 10, the current flow from the connectors 246 to the central portion 244 tends to follow two generally distinct electrical paths, viz. an upper Path I and a lower Path II.

The current conducting heating elements 220 fit across the melter 52 like the heating elements 120.

If in a receptacle, e.g. the melting chamber 122, the temperature of molten glass at the upper Path I of the heater elements 220 becomes cooler than molten glass near the lower Path II, resistance of the metal in the elements 220 along Path I becomes less than the resistance of the metal along Path II. Accordingly, additional current flows along Path I to increase the temperature of the upper portion of the heating elements. In similar fashion, if conditions reduce the temperature of the metal in the lower Path II of the elements 120, additional current flows along that path to increase temperatures of the lower portion of the heating elements. Consequently, temperature conditions along the length and width $w$ effect current flow to somewhat compensate and make more even thermal treatment of molten glass treated by the heating elements 220. Thus, the operation of the heating elements 220 is similar to the operation of the heating elements 120.

Referring to FIGS. 3 and 4, the feeder or bushing 16, which is beneath and is registered with the melter outlet passageway 124, includes a bottom wall 270, side walls 272 and end walls 274. The side and end walls terminate with laterally extending flanges 276. Refractory members 278 thermally and electrically insulate the flanges 276 of the feeder 16 from the bottom flanges 140 of the liner 130. Moreover, refractory 280 surrounds the exterior of the feeder 16. Frame members 282 support the high temperature resistant refractory 280 in a conventional manner.

As in the case of the liner 130 and the current conducting heating elements 120, the walls 272, 274 and 270 are made of platinum or an alloy of platinum.

A group of orificed tips or tubular projections 284 extend from the exterior of the bottom wall 270. It is through these tubular projections 284 that molten glass discharges from the feeder 16 in the form of the molten glass streams 14.

As more clearly seen in FIGS. 1-3, the end walls 274 have terminals 286 that receive electrical energy from a power transformer 288 through conductors 290. Electrical current supplied to the feeder 16 through the terminals 286 heats the feeder 16 by resistance heating to maintain the molten glass in the feeder 16 at desired temperatures and viscosities.

Disposed adjacent to and somewhat below the bottom wall 270 of the feeder 16 is a manifold 292. Extending transversely from the manifold 292 are fins or veins 294 that conduct heat away from the molten glass streams 14 to render the glass of the streams more viscous for efficient attenuation of the continuous glass filaments 20. The manifold 292 has an inlet tube 296 and an outlet tube 298 that circulate heat absorbing fluid such as water through the manifold 292. A mounting structure 300 secured to a frame member 301 supports the manifold 292.

As shown in FIGS. 1 and 2, the processing assembly 12 includes a cover or hood 302 disposed above the batch supply portion 60 and batch distributing portion 62. From the top of the hood 302 extends a stack or pipe 304 preventing the batch distributing portion 62 from contaminating with fine particles of batch the filament forming region at the bottom wall 270. The stack or pipe 304 may connect to a suction blower to initiate forced air circulation around the batch distributing portion 62.

Figure 12:
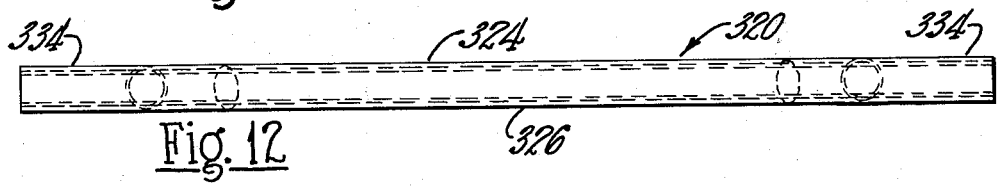
FIG. 12 is a plan view of another heating element according to the principles of the invention.
Figure 13:
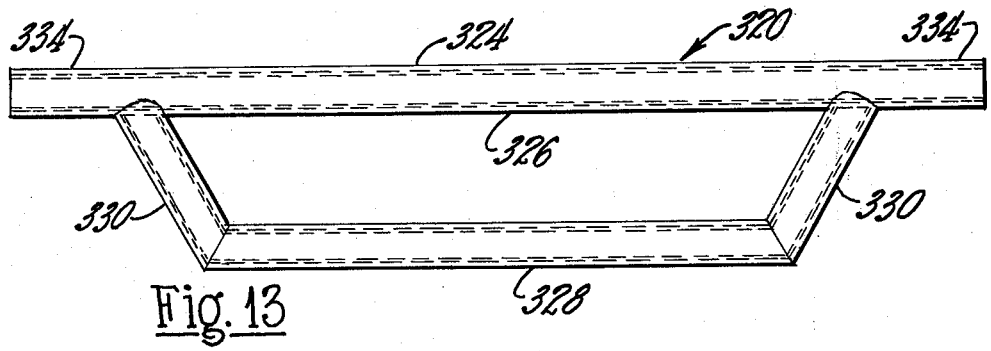
FIG. 13 is a side elevation view of the heating element shown in FIG. 12.

FIGS. 12 and 13 show yet another embodiment of an electrical current conducting heating element, denoted by the reference numeral 320, according to the principles of the invention. Like the other heating elements, the element 320 has appreciable depth or width compared with its thickness. And it is made of the same electrical current conducting tubular material as is the element 120; heat resistant material, like the element 120, in the form of refractory (aluminum oxide) is within the tubular material.

The elongated element 320 includes a central portion 324 that is formed by two spaced apart parallel elements 326 and 328 and by shorter straight elements 330 connecting the elements 326 and 328 together. Straight connector portions 334 extend from each end of the element 320. As shown the portions 334 are extensions of the straight element 326.

So, like elements 120, elements 320 each includes; an elongated central portion including two spaced apart parallel straight cylindrical portions, shorter end portions connecting the straight portions, and connectors extending from each end extending along the longitudinal axis of the element. The connectors (334) are straight.

Elements 320 are connected for melting like the elements 120 as shown in FIGS. 3 and 4.

We claim:

1. Apparatus for producing continuous glass filaments comprising:

a melting receptacle of high temperature resistant material having at least a partially open top and a partially open bottom, glass formed in the receptacle flowing downwardly through the partially open bottom;

a plurality of adjacent generally parallel longitudinal heating elements each extending along a longitudinal axis across the interior of the receptacle, the elements including a hollow outer electrical current conducting portion and heat resistant material within the outer portion, the heating elements being positioned to be beneath the surface of a body of molten glass formed within the receptacle, the longitudinal heating elements having an elongated central portion including two spaced apart parallel straight cylindrical portions and shorter end portions connecting the straight portions, the heating elements each including a connector at each end extending along the longitudinal axis of its heating element, the straight portions being in a plane oriented generally vertically;

means for delivering batch mineral material in comminuted form to the receptacle through the opening in the top of the receptacle;

means electrically connecting the heating elements in parallel for supplying electrical energy effective to heat the current conducting portion of the heating elements to form molten glass from the batch mineral material;

a feeder communicating with the melting receptacle through the bottom opening in the melting receptacle, molten glass flowing from the melting receptacle through the bottom opening into the feeder, the bottom of the feeder having holes through which the molten glass flows as molten streams;

electrical means effective to heat the feeder; and means for attenuating the molten glass streams into continuous glass filaments.

2. Apparatus for producing continuous glass filaments comprising:

a melting receptacle of high temperature resistant material having at least a partically open top and a partially open bottom, glass formed in the receptacle flowing downwardly through the partially open bottom;

a plurality of adjacent generally parallel longitudinal heating elements each extending along a longitudinal axis across the interior of the receptacle, the elements including a hollow outer electrical current conducting portion and heat resistant material within the outer portion, the heating elements being electrically separated from the melting receptacle and being positioned to be beneath the surface of a body of molten glass formed within the receptacle, the longitudinal heating elements having an elongated central portion including two spaced apart parallel straight cylindrical portions and shorter end portions connecting the adjacent ends of the straight portions, the shorter end portions each including a nonlinear connector extending along the longitudinal axis of its heating element, the straight portions being in a plane oriented generally vertically;

means for delivering batch mineral material in comminuted form to the receptacle through the opening in the top of the receptacle;

means electrically connecting the heating elements in parallel for supplying electrical energy effective to heat the current conducting portion of the heating elements to form molten glass from the batch mineral material;

a feeder communicating with the melting receptacle through the bottom opening in the melting receptacle, molten glass flowing from the melting receptacle through the bottom opening into the feeder, the bottom of the feeder having holes through which the molten glass flows as molten streams;

electrical means effective to heat the feeder; and means for attenuating the molten glass streams into continuous glass filaments.

3. Apparatus for producing continuous glass filaments comprising:

a melting receptacle of high temperature resistant material for holding molten glass formed therein from batch mineral material, the receptacle having at least a partially open top and a partially open bottom;

a feeder communicating with the melting receptacle through the bottom opening in the melting receptacle, molten glass flowing from the melting receptacle through the bottom opening into the feeder, the bottom of the feeder having holes through which the molten glass flows as molten streams;

a plurality of side-by-side longitudinal heating elements each extending along a longitudinal axis across the interior of the receptacle, the elements having an appreciable depth compared with their thickness and being oriented with their depth dimensions extending in the direction of flow of molten glass from the receptacle to the feeder, the elements including a hollow outer electrical current conducting portion and heat resistant material within the outer portion, the heating elements being electrically separated from the melting receptacle and being positioned to be beneath the surface of a body of molten glass formed within the receptacle, the elements having a central portion including two generally straight elongated portions spaced apart in the direction of the flow of the molten glass and end portions connecting the adjacent ends of the generally straight elongated portions, the end portions including a nonlinear connector extending along the longitudinal axis of its heating element;

means for delivering batch mineral material in comminuted form to the receptacle through the opening in the top of the receptacle;

means electrically connecting the heating elements in parallel for supplying electrical energy through the current conducting portions thereof effective to heat the elements sufficiently hot to form glass from the batch mineral material;

electrical means effective to heat the feeder; and means for attenuating the molten glass streams emitted from the holes in the bottom of the feeder into continuous glass filaments.

4. The apparatus of claim 3 in which the end portions are shorter than the central elongated portions.

5. The apparatus of claim 4 in which the end portions are elongated and include metal strips extending outwardly and lengthwise thereof to promote uniform division of electrical current to the elongated central portions.

* * * * *